US00RE41525E

(19) United States
(12) Reissued Patent
Chien et al.

(10) Patent Number: US RE41,525 E
(45) Date of Reissued Patent: Aug. 17, 2010

(54) METHOD AND APPARATUS FOR DISPLAYING AND ADJUSTING SUBTITLES OF MULTIPLES LANGUAGES BETWEEN HUMAN-MACHINE INTERFACES

(76) Inventors: Cheng-Pang Chien, 4F., No. 340, Lane 1050, Minghu Rd., Hsinchu City 300 (TW); Kun-Shan Tsai, 3rd Fl., No.22, Ren Ai Street, Neighborhood 3, Chin Ren Village, East District, Hsin Chu City 300 (TW); Tian-Quey Lee, No. 5, Alley 16, Lane 261, Section 1, Yanping Rd., Hsinchu City 300 (TW)

(21) Appl. No.: 11/480,251

(22) Filed: Jun. 29, 2006

(Under 37 CFR 1.47)

Related U.S. Patent Documents

Reissue of:
(64) Patent No.: 6,757,023
Issued: Jun. 29, 2004
Appl. No.: 09/901,691
Filed: Jul. 11, 2001

U.S. Applications:

(63) Continuation-in-part of application No. 09/418,039, filed on Oct. 14, 1999, now Pat. No. 6,445,421.

(51) Int. Cl.
*H04N 7/08* (2006.01)

(52) U.S. Cl. ..... 348/468; 348/569; 704/8
(58) Field of Classification Search ..... 348/468, 348/564, 465, 563, 569; 386/95, 125; 704/7, 704/8
See application file for complete search history.

(56) References Cited

U.S. PATENT DOCUMENTS 4,122,533 A * 10/1978 Kubinak ..... 715/236
4,980,829 A * 12/1990 Okajima et al. ..... 704/5
5,105,179 A * 4/1992 Smith ..... 340/468
5,148,541 A * 9/1992 Lee et al. ..... 707/2
5,307,265 A * 4/1994 Winans ..... 704/8
5,319,745 A * 6/1994 Vinsonneau et al. ..... 715/234
5,590,317 A * 12/1996 Iguchi et al. ..... 707/2
5,818,935 A * 10/1998 Maa ..... 380/200
5,847,699 A * 12/1998 Kitahara et al. ..... 345/551
5,890,103 A * 3/1999 Carus ..... 704/9
5,910,805 A * 6/1999 Hickey et al. ..... 345/467
5,963,744 A * 10/1999 Slavenburg et al. ..... 712/9
6,446,081 B1 * 9/2002 Preston ..... 707/104.1
6,631,500 B1 * 10/2003 Kumhyr ..... 715/236
6,668,355 B1 * 12/2003 Shiratori ..... 715/201
6,798,887 B1 * 9/2004 Andre ..... 381/73.1
6,901,427 B2 * 5/2005 Teshima ..... 709/203

* cited by examiner

*Primary Examiner*—Victor Kostak
(74) *Attorney, Agent, or Firm*—Perkins Coie LLP

(57) ABSTRACT

The present invention relates to a method and apparatus for displaying subtitles by a multination language human-machine interface that having small memory space occupation and conveniently for program maintenance. First of all, a character database is been edited, and in accordance with the character size to edit the bitmap file for each individual character. The bitmap file is then transferred to 85c51xa assembly language and stored in the character database. Then, the "string code", the "string combination code and position shifting code", and the "string combination code of multination language and position shifting code" of the controlling program are established, and the content of the character database is been called. During a practical usage, the desired string is been called by the controlling program, then carried out the language judgement of the exercising nation. Next, in accordance with the characters included in the desired string, extracting from the character database, drawing the string and showing on the screen eventually.

17 Claims, 9 Drawing Sheets

| Main Menu | | | |
|---|---|---|---|
| SETUP | IMAGE | AUDIO | MEETING |

FIG. 2

| Menu Principal | | | |
|---|---|---|---|
| CONFIG. | IMAGE | AUDIO | REUNION |

FIG. 3

| Hauptmenu | | | |
|---|---|---|---|
| EINRICHT. | BILD | AUDIO | MEETING |

FIG. 4

METHOD AND APPARATUS FOR DISPLAYING AND ADJUSTING SUBTITLES OF MULTIPLES LANGUAGES BETWEEN HUMAN-MACHINE INTERFACES

Matter enclosed in heavy brackets [ ] appears in the original patent but forms no part of this reissue specification; matter printed in italics indicates the additions made by reissue.

This application is a continuation-in-part (CIP) application of U.S. patent application Ser. No. 09/418,039, filed Oct. 14, 1999.

BACKGROUND OF THE INVENTION

1. Field of the Invention

The present invention relates to an improved method and apparatus for displaying and adjusting subtitles by a multination language human-machine interface, and more particularly, to an improved method and apparatus for displaying and adjusting subtitles by a multination language human-machine interface that having small memory space occupation and conveniently for program maintenance.

2. Description of the Prior Art

FIG. 1 shows the technological flowchart for displaying the subtitle of multination language human-machine interface by the conventional monitors. First of all, the basic concept would be gradually setting up the string (step 110) and the location of the string list (step 120) for every different country, and then forming as a bitmap file (step 130). Finally, the above bitmap file is transferred to 80c51xa assembly language, where the assembly language used by chips will be programmed (step 140) and also provide the use of controlling program for the screen displaying control. Wherein the string been displayed on monitors is handled by the method of uniformly lining up to the left of the list.

Three sorts of different language subtitle, such as English, French and Germany, been displayed on monitors are shown in FIGS. 2, 3 and 4 respectively. The conventional method for displaying the synonymous string of the same list in those three figures, such as "Main Menu" in English, "Menu Principal" in French, and "Hauptmenu" in German, is firstly to edit the character strings of those three languages individually. Each character string will be uniformly lined up to the left of the list and drawn to its bitmap file, as well as transferred to its 80c51xa assembly language relatively. Therefore, there is a need to draw a relative bitmap file for every different country and for every different string list. Hence, at least two drawbacks have been introduced by the conventional method: (1) A huge bitmap file database for the strings consumes a large amount of the programmed memory; and (2) any addition or correction of a string in the list would result in a redraw of the relative bitmap file, hence making a hassle to the program maintenance.

Thus, because of solving two drawbacks which have been introduced, an improved method and apparatus for displaying subtitles of multination language human-machine interface that substantially occupies smaller memory space and easy for program maintenance is provided. FIG. 5 shows the flowchart of establishing the information structure of conventional invention. Procedure 1 is to edit a character database, and in accordance with the character's size and symbol to edit the bitmap file for each individual character (Step 510). The bitmap file is then transferred to 80c51xa assembly language format (Step 520) and stored in the character database (Step 530) for providing repeats in calling usage of the controlling program. Procedure 2 is to establish the "string code" (Step 540) and the "string combination code" (Step 550) of the controlling program. Next, Procedure 3 is to establish the "string combination code of multination language" (Step 560) within the "string combination code". The last procedure is to call and exercise the character database contents (Step 570) in accordance with "string combination code of multination language". FIG. 6 shows the technological flowchart of a method for displaying subtitles by a multination language human-machine interface of the conventional invention. First of all, the desired string is been called by the controlling program (Step 610), and handled by the method of uniformly lining up to the left (Step 620). Next, in accordance with the characters included in the desired string, extracting from the character database (Step 630), drawing the string and showing on the screen eventually (Step 640).

Although the said method can reach the purposes which can occupies smaller memory space and easy for program maintenance, the string is handled by the method of uniformly lining up to the left and displaying the subtitle of multination language shows the different length will make display screen not clean and beautiful. Hence, for solving this drawback, an improved method and apparatus for displaying and adjusting subtitles of multination language human-machine interface that can adjust the right position of different strings of multination characters is provided.

SUMMARY OF THE INVENTION

An objective of the present invention is to transfer the requiring characters, figures, and symbols to a character database, that is provided to be called by a controlling program and been used in a combination in achieving the target of saving memory space. In another objective of the present invention, as referring to a same meaning of multination language strings in different lengths, and in accordance with the character number of the "string combination code of multination language", the combination of the relative string length and the calling usage for the character database can be adjusted elastically.

In a further objective of the present invention, a fixed information structure of strings makes maintenance and adjustment easier. In a last objective of the present invention, the controlling program and the information structure are easy to be adjusted while the microprocessor is been replaced.

The principle technological thoughts of the present invention are: (1) A country selection program is designed within the human-machine interface system, which is capable in transferring the subtitle into the relative different nation's language. (2) Characters used by many different nations' language, such as English, French, German, ect., are repeated in a great amount, this characteristic can be specified as to provide repeats in calling usage for the controlling program while building up the character database. (3) Adjusting the different position of the multination language in accordance with different strings, which would make screen more beautiful and simplify the method that adjust the position of string less complicated.

The present invention relates to a method and apparatus for displaying subtitles by a multination language human-machine interface. First of all, a character database is been edited, and in accordance with the character size to edit the bitmap file for each individual character. The bitmap file is then transferred to 80c51xa assembly language and stored in the character database. Then, the "string code", the "string combination code and position shifting code", and the "string combination code of multination language and position shifting code" of the controlling program are established, and the content of the character database is been called. During a practical usage, the desired string is been called by the controlling program, then carried out the language judgement of the exercising nation. Next, in accordance with the characters included in the desired string, extracting from the character database, drawing the string and showing on the screen eventually.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 indicates conventional English subtitle displaying screen by a multination language human-machine interface;

FIG. 3 indicates conventional French subtitle displaying screen by a multination language human-machine interface;

FIG. 4 indicates conventional German subtitle displaying screen by a multination language human-machine interface;

DESCRIPTION OF THE PREFERRED EMBODIMENT

Figure 1:
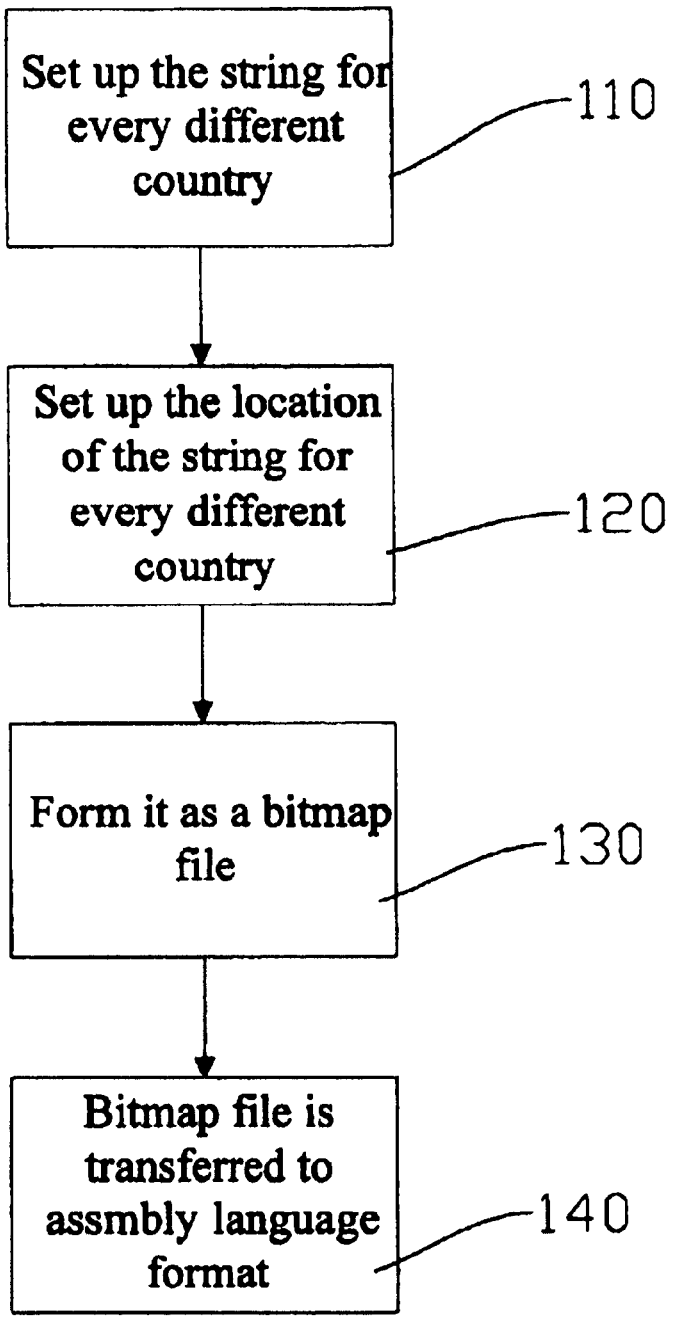
FIG. 1 shows the conventional technological flowchart for displaying the subtitle by a multination language human-machine interface.
Figure 5:
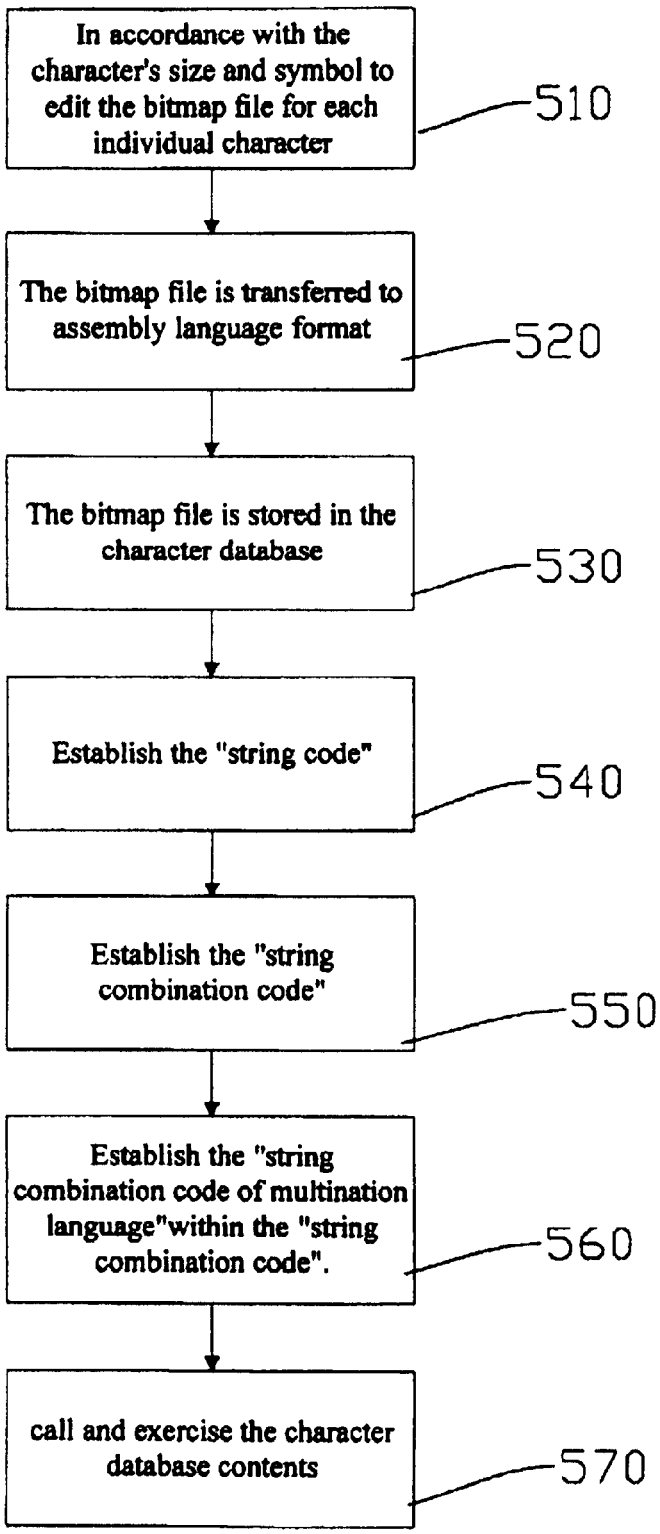
FIG. 5 shows the flowchart of establishing the information structure of the conventional invention.
Figure 6:
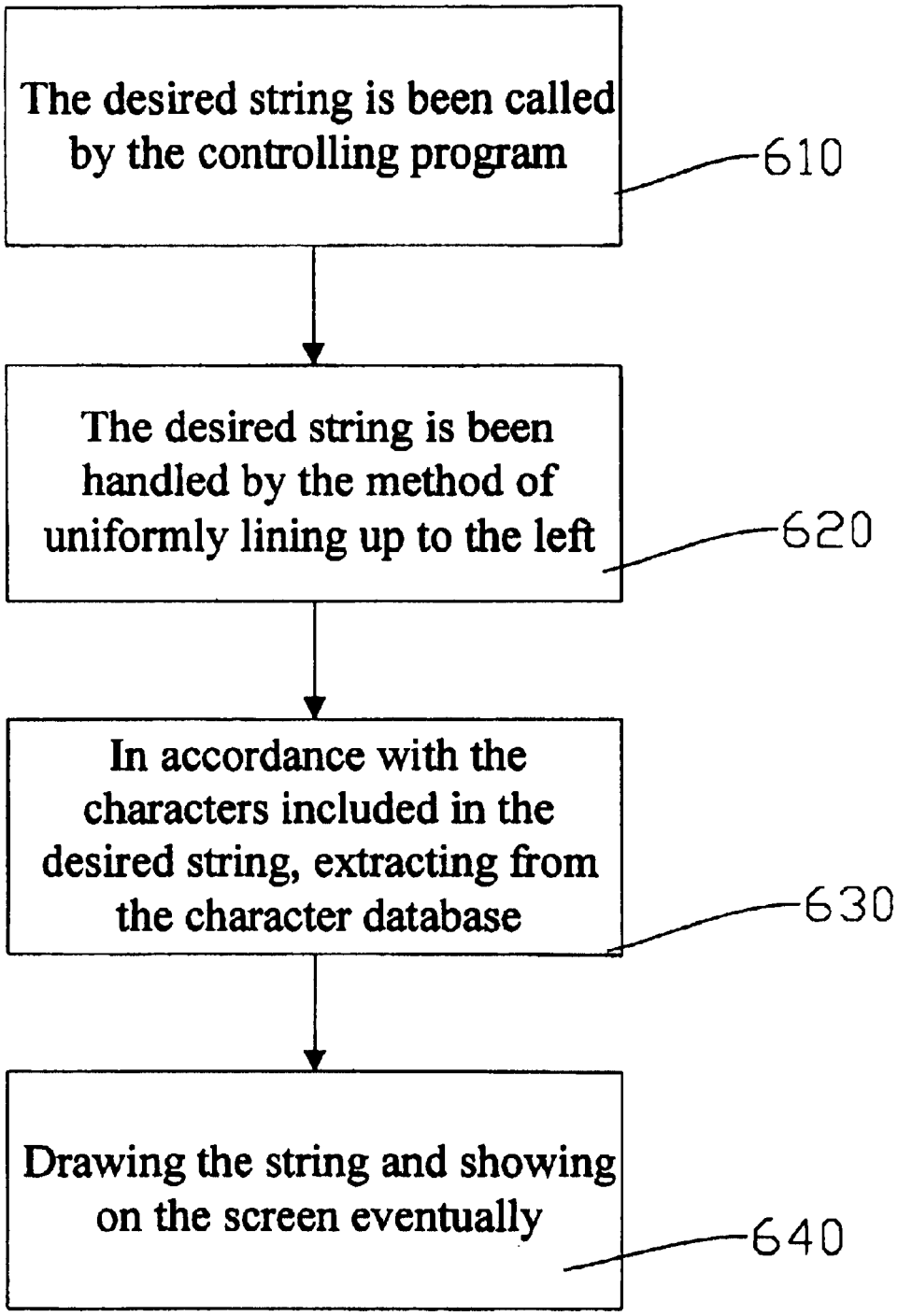
FIG. 6 shows the technological flowchart of a method for displaying subtitles by a multination language human-machine interface of the conventional invention.
Figure 7:
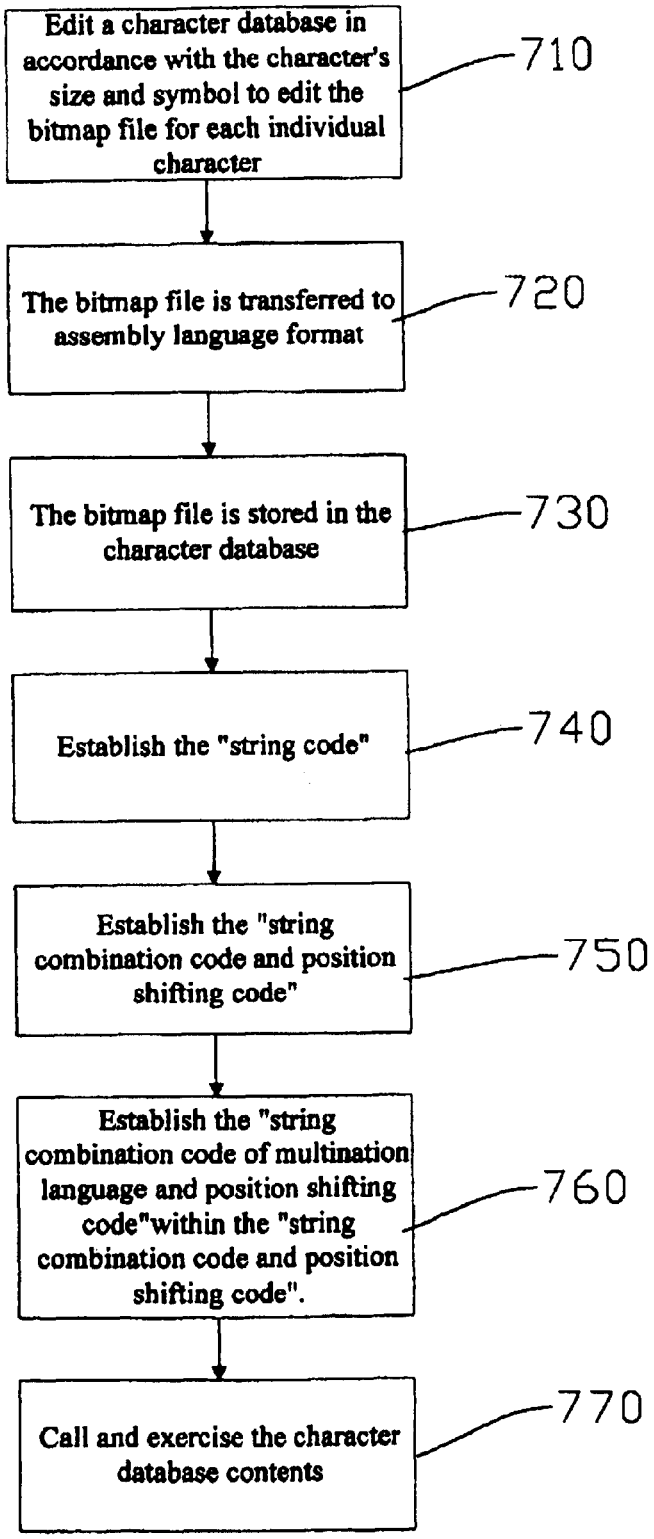
FIG. 7 shows the flowchart of establishing the information structure of the present invention.

First of all, the information structure been used by the present invention is been illustrated, where FIG. 7 shows the flowchart of establishing the information structure of the present invention. Procedure 1 is to edit a character database, and in accordance with the character's size and symbol to edit the bitmap file for each individual character (Step 710). The bitmap file is then transferred to 80c51xa assembly language format (Step 720) and stored in the character database (Step 730) for providing repeats in calling usage of the controlling program. Procedure 2 is to establish the "string code" (Step 740) and the "string combination code and position shifting code" (Step 750) of the controlling program. Next, Procedure 3 is to establish the "string combination code of multination language and position shifting code" (Step 760) within the "string combination code and position shifting code". The last procedure is to call and exercise the character database contents (Step 770) in accordance with "string combination code of multination language and position shifting code". Adjusting the different position of the multination language in accordance with the quantity of position shifting language X and Y coordinate of "string combination code of multination language and position shifting code", which would make screen more beautiful and simplify the method that adjust the position of string less complicated.

The following program exemplification is based on three commonly used international languages, that are, English, French and German, where the program for different nations' language selection and the character bitmap file of the calling character database for the present invention is shown. The first step of program model is to define the string code and character combination code. Normally the character combination code of multiple language is defined after the combination code of character defined. And then the necessary character number and the character database for substantially calling are all defined. Therefore the whole program is written as the following:

```
Setup_str:
    DW STRING, X pos, Y pos, S_Setup;
    DW 80H
S_Setup:
    DW ENG_Setup, FRE_Setup, Deu_Setup;
ENG_Setup:
    DB 5, 0, 0, 00H;
    DW C_B_S, C_B_E, C_B_T, C_B_U, C_B_P;
FRE_Setup:
    DB 7, -3, 1, 00H;
    DW C_B_C, C_B_O, C_B_N, C_B_F, C_B_I, C_B_G,
      C_B_Dot;
Deu_Setup:
    DB 9, -10, 0, 00H;
    DW C_B_E, C_B_I, C_B_N, C_B_R, C_B_I, C_B_C,
      C_B_H, C_B_T, C_B_Dot;
```

Wherein:

"Setup-str": String code is announced;

"DW STRING, X pos, Y pos, S_Setup": Call string combination code and position shifting code program and process the selection of nation's language for inputting string;

DW 80H": ending;

"S_Setup": Announce the string combination code of multination language;

"DW ENG_Setup, FRE_Setup, Deu_Setup": Calling to input string that relates to the character combination program of the nation's language;

"ENG_Setup": English character section announces;

"FRE_Setup": French character section announces;

"Deu_Setup": Germany character section announces;

"DB 5, 0, 0, 00H": Providing the number of English character and the quantity of position shifting along X and Y coordinate, wherein, "5" is the number of English character, "0, 0" is the quantity of position shifting along X and Y coordinate;

"DW C_B_S, C_B_E, C_B_T, C_B_U, C_B_P": Calling S_E_T_U_P characters from the character database, wherein, C_is the calling of character database, B_ s the calling of capital form for every letter, L_ is the calling of lower case letter;

"DB 7, −3, 1, 00H": Providing the number of French character and the quantity of position shifting along X and Y coordinate, wherein, "7" is the number of French character, "−3, 1" is the quantity of position shifting along x and Y coordinate;

"DW C_B_C, C_B_O, C_B_N, C_B_F, C_B_I, C_B_G, C_B_Dot": Calling C_O_N_F_I_G, characters from the center database;

"DB 9, −10, 0, 00H": Providing the number of Germany character and the quantity of position shifting along X and Y coordinate, wherein, "9" is the number of Germany character, "−10, 0" is the quantity of position shifting along X and Y coordinate;

DW C_B_E, C_B_I, C_B_N, C_B_R, C_B_I, C_B_C, C_B_H, C_B_T, C_B_Dot": Calling E_I_N_R_I_C_H_T_, characters from the character database.

Figure 8:
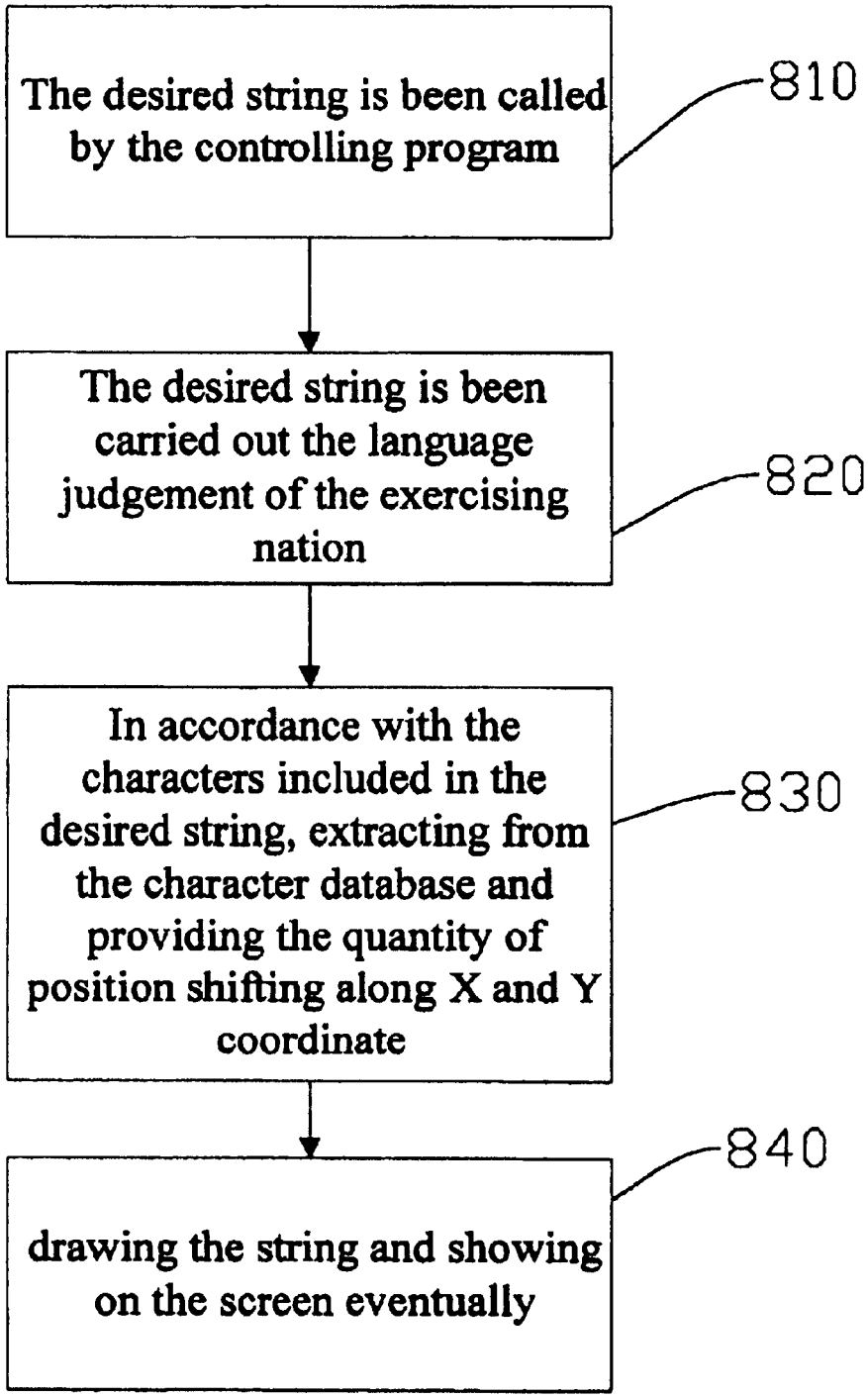
FIG. 8 shows the technological flowchart of an improved method and apparatus for displaying and adjusting subtitles by a multination language human-machine interface of the present invention.
Figure 9:
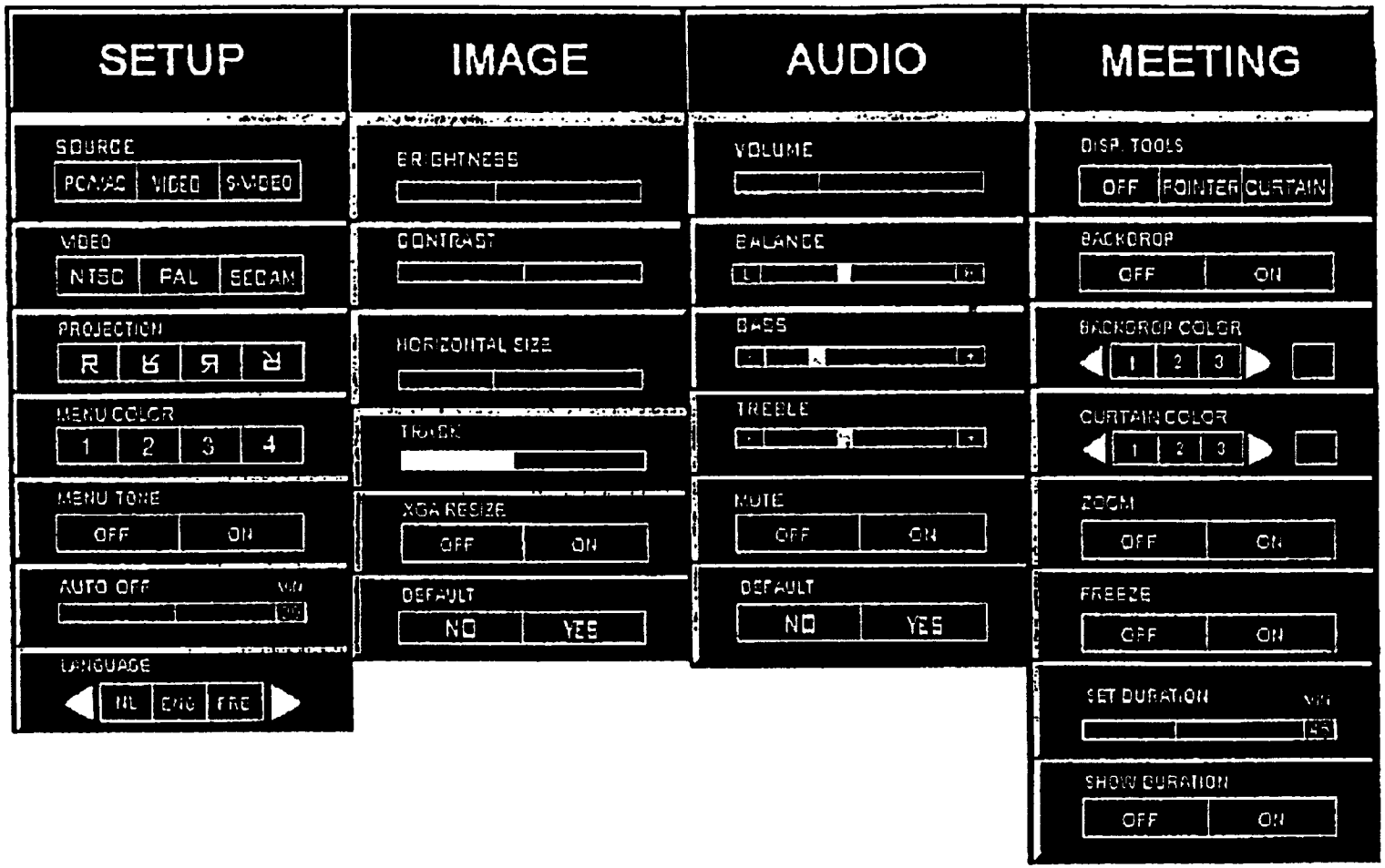
FIG. 9 indicates present English subtitle displaying screen by a multination language human-machine interface.
Figure 10:
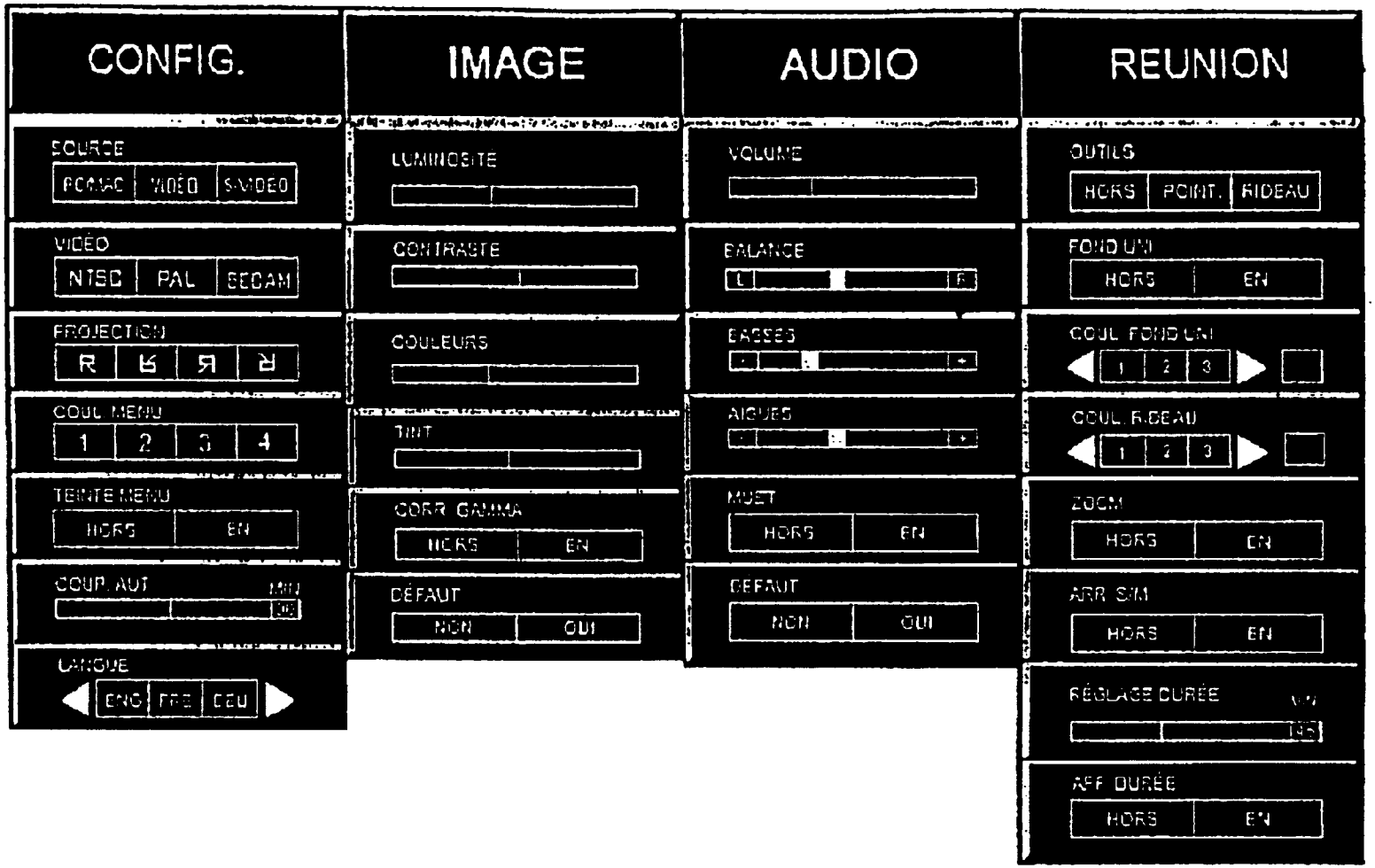
FIG. 10 indicates present French subtitle displaying screen by a multination language human-machine interface.
Figure 11:
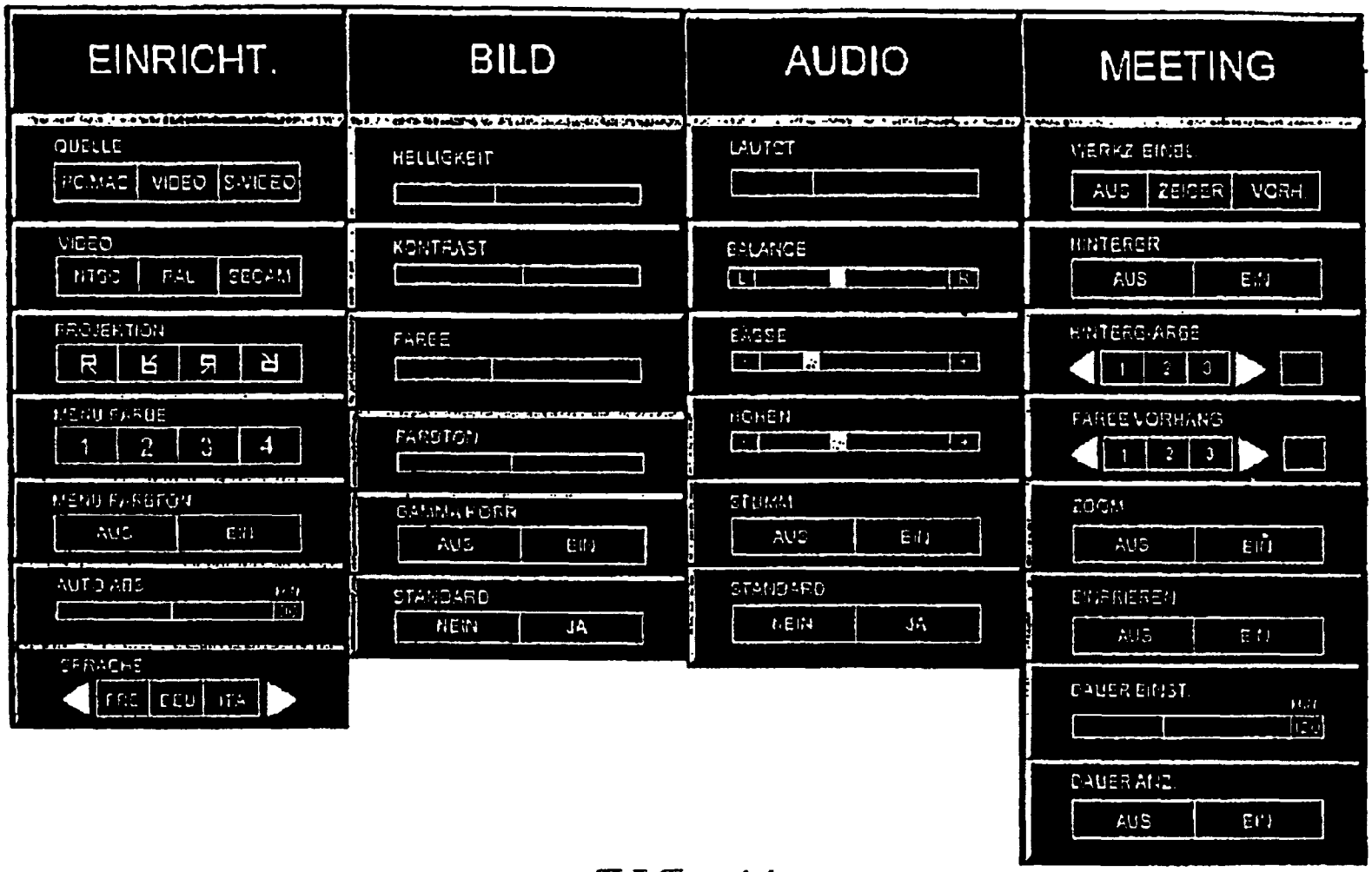
FIG. 11 indicates present German subtitle displaying screen by a multination language human-machine interface.

FIG. 8 shows the technological flowchart of an improved method and apparatus for displaying and adjusting subtitles by a multination language human-machine interface of the present invention. First of all, the desired string is been called by the controlling program (Step 810), then carried out the language judgement of the exercising nation (Step 820). Next, in accordance with the characters included in the desired string, extracting from the character database and providing the quantity of position shifting along X and Y coordinate (Step 830), drawing the string and showing on the screen eventually (Step 840). Moreover, the present invention can take the advantage of application specific integrated circuit (ASIC) and micro-controller to use for any sort of the screen of audio facility such as TV, projector, DVD player and Audio/Video System. FIGS. 9, 10, 11 show the result of indicating present English, French, Germany subtitles displaying screen by a multination language human-machine interface respectively.

While the invention has been described by way of examples and in terms of one preferred embodiment, it is to be understood that the invention need not be limited to the disclosed embodiments. On the contrary, it is intended to cover various modifications and similar arrangements included within the spirit and scope of the appended claims, the scope of which showed be accorded the broadest interpretation so as to encompass all such modifications and similar structures.

What is claimed is:

1. A method for displaying a subtitle of multilingual human-machine interface, *the method* comprising[the steps of]:

determining a string;

selecting a language for the string for establishing a character information structure, wherein [said step of] establishing comprises[the steps of]:

editing a *respective* bitmap file for [each] *an* individual character in accordance with the character's size and symbol;

transforming the bitmap file to an assembly language format;

storing the assembly language within [said] *the* bitmap file;

establishing a string code;

establishing a string combination code and a position shifting code;

establishing a multilingual string combination code and a multilingual position shifting code in accordance with the string combination code and the position shifting code;

developing the character information structure via a character database in accordance with the multilingual string combination code and the multilingual position shifting code;

extracting a character information from the character database in accordance with a character of [said] *the* string of the selected language; and adjusting and [displaying] *transmitting* the string to a displaying device.

2. The method according to claim 1, wherein [said] *the* displaying device comprises a micro-controller.

3. The method according to claim 1, wherein [said] *the* displaying device comprises an application specific integrated circuit (ASIC).

4. The method according to claim 1, wherein [said] *the* displaying device is a DVD player.

*5. An apparatus, comprising:*

*an application specific integrated circuit (ASIC), configured to form an information structure for a plurality of strings, wherein the plurality of strings comprise characters that appear in a plurality of languages, the information structure comprising:*

*a plurality of bitmap files corresponding respectively to the characters; and*

*a plurality of string codes, wherein one or more string codes comprise:*

*a position shifting code comprising a horizontal shift component that provides an adjustment to a horizontal position of at least one of the characters, and a vertical shift component that provides an adjustment to a vertical position of at least one of the characters; and*

*a string combination code comprising a list of characters in the plurality of strings for the plurality of languages.*

*6. The apparatus of claim 5 wherein the ASIC is further configured to:*

*receive a string;*

*select a language for the string from among the plurality of languages, wherein the selection is performed by a country selection program;*

*assemble the string in the selected language by retrieving a list of characters pertaining to the selected language from the string combination code and retrieving the respective bitmap file for the characters in the string;*

*adjust a position of at least one character, the adjustment being based at least in part upon the position shifting code; and*

*provide the one or more retrieved characters to a display device.*

*7. The apparatus of claim 5 wherein the plurality of languages comprises English, German, and French.*

*8. The apparatus of claim 5 wherein the ASIC is further configured to convert the bitmap file to assembly language for storage in a memory device.*

*9. A computer-readable storage medium storing computer-executable instructions that, if executed, cause a computing system to perform a method for displaying a subtitle of a multilingual human-machine interface, the method comprising:*

*receiving a string;*

*storing a plurality of string codes comprising a string combination code and a position shifting code, wherein the string combination code comprises one or more lists of characters, the lists pertaining respectively to at least one of a plurality of languages to describe the string in the plurality of languages, and wherein the position shifting code comprises instructions to adjust at least one of a horizontal position or a vertical position of one or more of the characters according to the language of the string;*

*forming a respective bitmap file for at least one character of the plurality of characters, wherein at least one of the*

*characters appears in the string in two or more of the plurality of languages;*

*storing the respective bitmap file for the characters in a character database;*

*determining a language of the string;*

*forming an information structure for the string based at least in part on the string combination code, the language of the string, and the position shifting code;*

*obtaining one or more bitmap files from the character database to spell the string based at least in part upon the information structure;*

*adjusting at least one of the horizontal or vertical position of at least one character based at least in part upon the information structure;*

*displaying the string on a display device in accordance with the information structure.*

*10. The computer-readable storage medium of claim 9 wherein displaying the string on the display comprises displaying a character that appears in the string in at least two of the plurality of languages, and wherein the character is adjusted according to the position shifting code to display the character in a first position if the language of the string is determined to be a first language, and wherein the character is adjusted according to the position shifting code to display the character in a second position if the language of the string is determined to be a second language.*

*11. The computer-readable storage medium of claim 10 wherein the first and second position differ by at least one of a vertical and a horizontal quantity specified in the position shifting code.*

*12. The article of claim 9 wherein the plurality of languages comprises English, German and French.*

*13. The computer-readable storage medium of claim 9 wherein the human-machine interface comprises an on-screen menu for at least one of a TV, a DVD player, a projector, and an audio/visual system.*

*14. A computer-readable storage medium whose contents, if executed, cause a computer system to perform a method for displaying a string in a plurality of languages, comprising:*

*storing a plurality of character bitmap files of characters, at least a subset of which appear in at least two separate languages and are associated with corresponding character bitmap files, wherein the corresponding character bitmap files are used in more than one language;*

*storing a plurality of information structures pertaining respectively to individual strings, the information structures comprising:*

*a plurality of character lists respectively containing characters that spell one of the individual strings in at least one of the separate languages; and*

*a position shifting code comprising at least one of a horizontal or a vertical position shift for the characters in the string, wherein the shift is at least partly based upon the language of the string;*

*receiving a country selection from a country selection program configured to indicate a display language;*

*displaying the string by:*

*retrieving from the information structure the character list and the position shifting code that pertains to the display language;*

*retrieving the character bitmap files listed in the character list;*

*shifting at least one of a horizontal or a vertical position of characters in the string, based at least in part upon the position shifting code; and*

*displaying the string on a display.*

*15. The computer-readable storage medium of claim 14 wherein the plurality of languages comprises English, French or German.*

*16. The computer-readable storage medium of claim 14 wherein the computer system comprises an Application Specific Integrated Circuit (ASIC) of at least one of a TV, a projector, a DVD player, and an audio/video system.*

*17. The computer-readable storage medium of claim 16 wherein the string comprises a word displayed as part of a menu structure for operating the TV, the projector, the DVD player, or the audio/video system.*

* * * * *